United States Patent
Teichmann et al.

(10) Patent No.: US 8,614,525 B2
(45) Date of Patent: Dec. 24, 2013

(54) METHODS AND SYSTEMS FOR OPERATING A POWER GENERATION SYSTEM

(75) Inventors: Ralph Teichmann, Niskayuna, NY (US); Kathleen Ann O'Brien, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/974,469

(22) Filed: Dec. 21, 2010

(65) Prior Publication Data

US 2012/0049637 A1    Mar. 1, 2012

(51) Int. Cl.
*H02J 3/44* (2006.01)

(52) U.S. Cl.
USPC .............................. 307/82; 307/64

(58) Field of Classification Search
USPC ........................ 307/82, 105, 64–66
See application file for complete search history.

(56) References Cited

U.S. PATENT DOCUMENTS

| | | | |
|---|---|---|---|
| 4,680,690 A | 7/1987 | Dickerson | |
| 5,896,281 A | 4/1999 | Bingley | |
| 6,750,391 B2 * | 6/2004 | Bower et al. | 136/244 |
| 6,862,199 B2 * | 3/2005 | Escobar et al. | 363/41 |
| 6,963,147 B2 * | 11/2005 | Kurokami et al. | 307/154 |
| 7,046,534 B2 | 5/2006 | Schmidt et al. | |
| 7,576,449 B2 * | 8/2009 | Becker et al. | 307/45 |
| 7,772,716 B2 * | 8/2010 | Shaver et al. | 307/31 |
| 7,804,198 B2 * | 9/2010 | Lowenstein | 307/105 |
| 2005/0057950 A1 * | 3/2005 | Colby et al. | 363/74 |
| 2009/0000654 A1 * | 1/2009 | Rotzoll et al. | 136/244 |
| 2010/0244575 A1 | 9/2010 | Coccia et al. | |
| 2010/0264744 A1 * | 10/2010 | Schmitt et al. | 307/82 |
| 2011/0084551 A1 * | 4/2011 | Johnson et al. | 307/24 |
| 2011/0304215 A1 * | 12/2011 | Avrutsky et al. | 307/82 |

FOREIGN PATENT DOCUMENTS

| | | |
|---|---|---|
| EP | 2071693 A2 | 6/2009 |
| WO | 2005117136 A2 | 12/2005 |

OTHER PUBLICATIONS

George Musser, "Invert your thinking: Squeezing more power out of your solar panels"; Scientific American, www.scientificamerican.com; Aug. 26, 2009, 3 pages.

"Addressing Safety and Power Quality for Grid-Connection"; www.energysavers.gov; Oct. 5, 2010; 1 page.

Yu, H. et al: "A multi-function grid-connected PV system with reactive power compensation for the grid", Solar Energy, Pergamon Press, Oxford GB, vol. 79, No. 1, Jul. 1, 2005, pp. 101-106.

EP Search Report and Opinion dated Jan. 28, 2013 from corresponding EP Patent Application No. 11193928.6.

* cited by examiner

*Primary Examiner* — Fritz M Fleming
(74) *Attorney, Agent, or Firm* — James McGinness, Esq.; Armstrong Teasdale LLP (57) ABSTRACT

A photovoltaic (PV) power generation system is described. The system includes a plurality of PV collector units that include at least one PV cell and a collector-side single-phase inverter. The plurality of PV collector units are configured for coupling with a symmetric poly-phase alternating current (AC) load. The system also includes a system controller configured to control operation of the plurality of PV collector units.

14 Claims, 7 Drawing Sheets

METHODS AND SYSTEMS FOR OPERATING A POWER GENERATION SYSTEM

BACKGROUND OF THE INVENTION

The embodiments described herein relate generally to a photovoltaic (PV) power generation system, and more specifically, to systems for coupling multiple variable input single-phase direct current (DC) power sources to a symmetric three-phase alternating current (AC) grid.

Solar energy has increasingly become an attractive source of energy and has been recognized as a clean, renewable alternative form of energy. Solar energy in the form of sunlight may be converted to electrical energy by solar cells. A more general term for devices that convert light to electrical energy is "photovoltaic cells." Sunlight is a subset of light. Thus, solar cells are a subset of photovoltaic (PV) cells. A PV cell comprises a pair of electrodes and a light-absorbing PV material disposed therebetween. When the PV material is irradiated with light, electrons that have been confined to an atom in the PV material are released by light energy to move freely. Thus, free electrons and holes are generated. The free electrons and holes are efficiently separated so that electric energy is continuously extracted. Current commercial PV cells use a semiconductor PV material, typically silicon.

In order to obtain a higher current and voltage, solar cells are electrically connected to form a solar module. In addition to a plurality of solar cells, the solar module may also include sensors, for example, an irradiance sensor, a temperature sensor, and/or a power meter. Solar modules may also be connected to form a module string. Typically, the DC voltages output by the module strings are provided to a grid inverter, for example, a DC to AC voltage inverter. The DC to AC voltage inverter converts the DC voltage to a single or three-phase alternating current (AC) voltage or current. The three-phase AC output can be provided to a power transformer, which steps up the voltage to produce a three-phase high-voltage AC that is applied to an electrical distribution grid.

Electricity applied to the electrical distribution grid is required to meet grid connectivity expectations. These requirements address safety issues as well as power quality concerns. For example, the grid connectivity expectations include facilitating disconnecting the power generation system from the grid in the event of a transient event, for example, a power surge or power failure. Another grid connectivity expectation is that the generated power be conditioned to ensure that the power matches the voltage and frequency of the electricity flowing through the grid. For example, the Institute of Electrical and Electronics Engineers (IEEE) has written a standard that addresses grid-connected distributed generation including renewable energy systems (IEEE 1547-2003). Underwriters Laboratories (UL) has also developed a standard, UL 1741, to certify inverters, converters, charge controllers, and output controllers for power-producing stand-alone and grid-connected renewable energy systems. UL 1741 verifies that inverters comply with IEEE 1547 for grid-connected applications.

Specifically, a grid-connected PV power generation system must meet utility interconnection requirements including low voltage ride through (LVRT), voltage regulation, and power factor correction.

BRIEF DESCRIPTION OF THE INVENTION

In one aspect, a photovoltaic (PV) power generation system is provided. The system includes a plurality of PV collector units that include at least one PV cell and a collector-side single-phase inverter. The plurality of PV collector units are configured for coupling with a symmetric poly-phase alternating current (AC) load. The system also includes a system controller configured to control operation of the plurality of PV collector units.

In another aspect, a method for converting direct current (DC) power to alternating current (AC) power for delivery to an electrical load is provided. The DC power is produced by a plurality of variable input power sources. The method includes providing a plurality of photovoltaic (PV) collector units each including at least one PV cell and a collector-side single-phase inverter. The plurality of PV collector units are configured to generate a DC voltage and convert the DC voltage to a single-phase AC output. The method further includes communicatively coupling at least one system controller to the plurality of PV collector units, and programming the system controller to control operation of the plurality of PV collector units.

In yet another aspect, a power conversion system is provided. The system includes a plurality of collector-side single-phase inverters configured to receive variable input direct current (DC) voltage. The system also includes a system controller coupled to the plurality of collector-side single-phase inverters and configured to control operation of the plurality of collector-side single-phase inverters. The plurality of collector-side single-phase inverters are configured to provide a symmetric poly-phase alternating current (AC) to an electrical load.

DETAILED DESCRIPTION OF THE INVENTION

The methods and systems described herein facilitate controlling a plurality of variable input single-phase power sources to produce power suitable for distribution and/or transmission on a symmetric three-phase electrical grid. The methods and systems described herein fulfill grid connectivity expectations including, but not limited to, providing steady-state and transient symmetry, controlling reactive power, responding to a symmetric or asymmetric fault current, shaping a ramp rate, and providing low voltage ride through (LVRT) capabilities, while minimizing capital expenditures, power conversion losses, and line losses. The methods and systems described herein also facilitate supporting grid symmetry during temporary failure or permanent degradation of a portion of the power generation assets.

Technical effects of the methods and systems described herein include at least one of: (a) providing a plurality of photovoltaic (PV) collector units each including at least one PV cell and a collector-side single-phase inverter, wherein the plurality of PV collector units are configured to generate a DC voltage and convert the DC voltage to a single-phase AC output; (b) communicatively coupling at least one system controller to the plurality of PV collector units; and, (c) programming the at least one system controller to control operation of the plurality of PV collector units.

Figure 1:
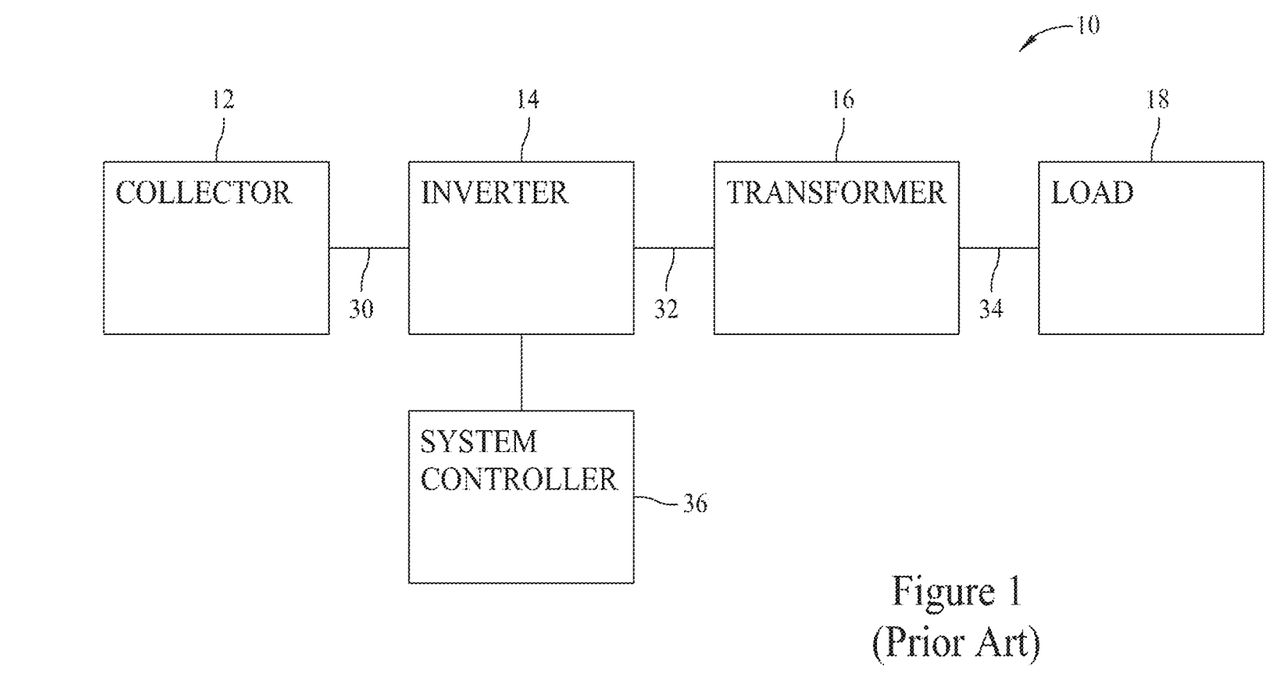
FIG. 1 is a block diagram of a known photovoltaic (PV) power generation system.

FIG. 1 is a block diagram of a known photovoltaic (PV) power generation system 10. System 10 includes a PV collection device 12, an inverter 14, a transformer 16, and an electrical grid 18. As referred to herein, electrical grid 18 is a network of conductors and devices configured for distribution and/or transmission of electricity. Typically, PV collection device 12 includes a plurality of PV module strings coupled, for example, by a DC switch gear (not shown in FIG. 1), that collects DC voltages from the PV module strings and outputs a DC voltage 30. DC voltage 30 is provided to inverter 14. Inverter 14 conditions DC voltage 30. For example, inverter 14 may be a DC/AC voltage inverter configured to convert DC voltage 30 to a three-phase low-voltage AC 32.

Three-phase low-voltage AC 32 is provided to power transformer 16. Transformer 16 generates a three-phase high-voltage AC 34, which is applied to a load, for example, electrical grid 18. System 10 also includes a system controller 36. System controller 36 is coupled to inverter 14 and configured to control operation of inverter 14.

Figure 2:
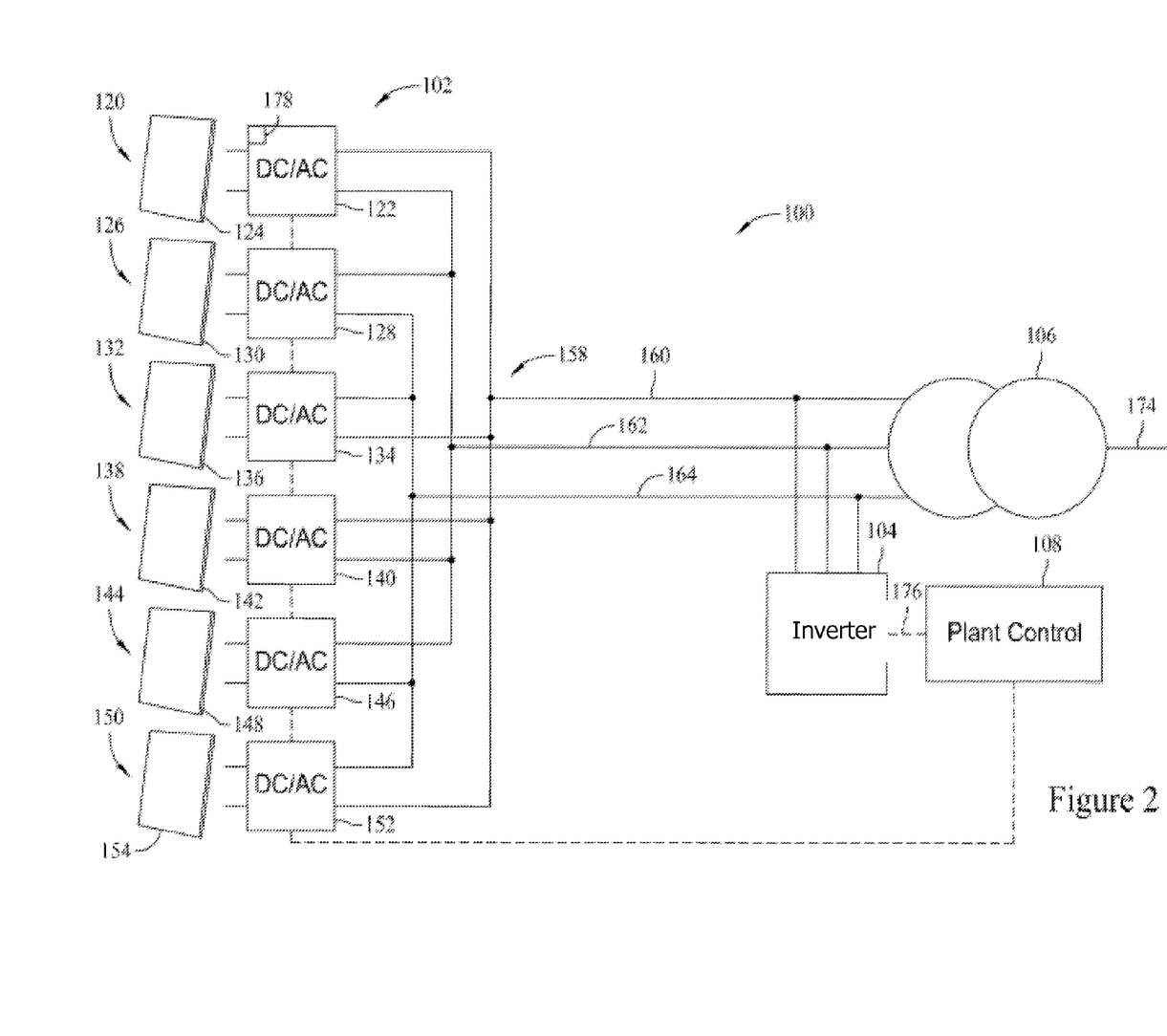
FIG. 2 is a block diagram of a first exemplary embodiment of a PV power generation system that includes a plurality of collector-side inverters.
Figure 3:
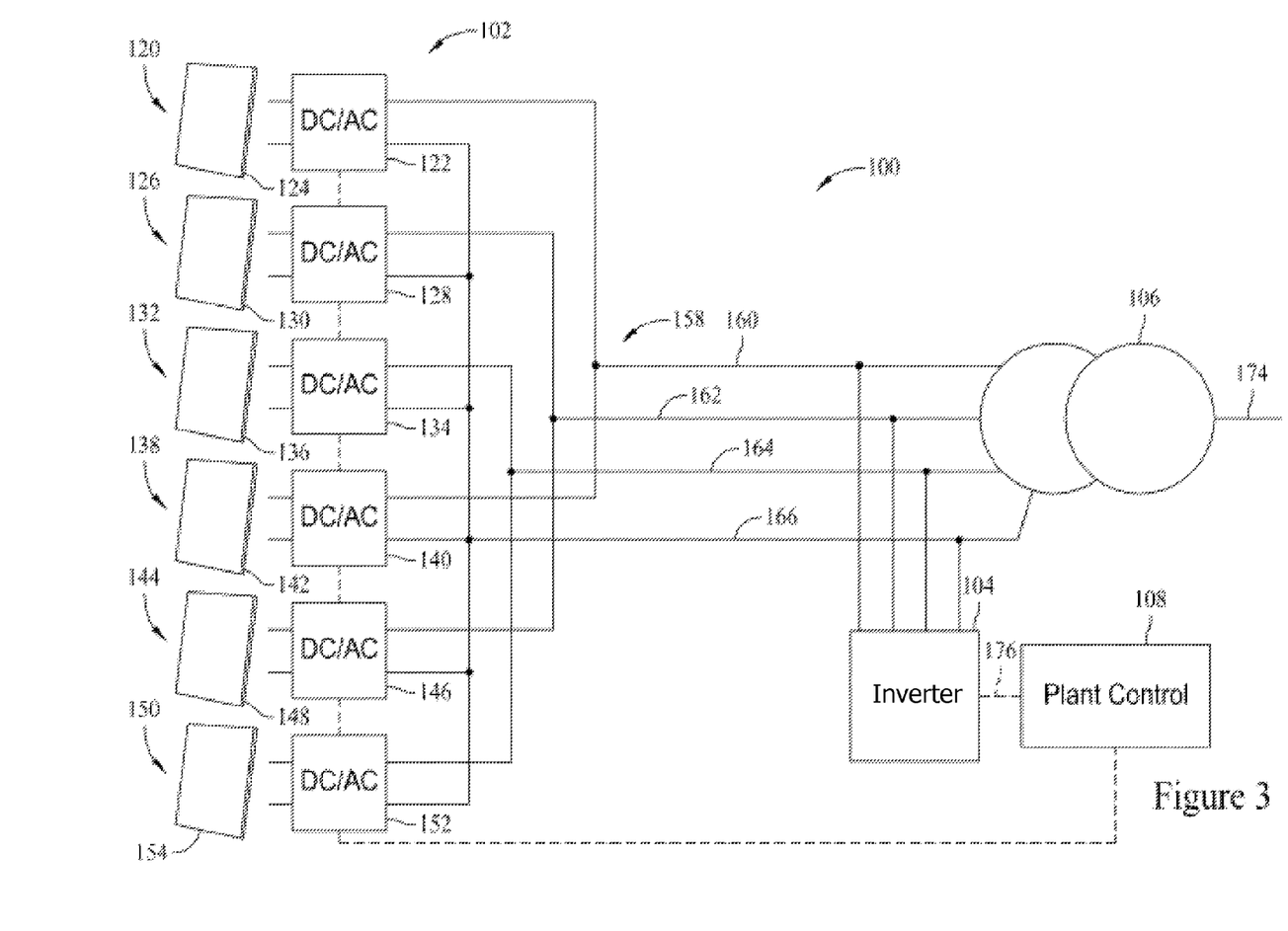
FIG. 3 is a block diagram of a second exemplary embodiment of the PV power generation system shown in FIG. 2.

FIG. 2 is a block diagram of a first exemplary embodiment of a PV power generation system 100 that includes a plurality of PV collector units 102. In the first exemplary embodiment, the plurality of PV collector units 102 are coupled in a delta configuration. FIG. 3 is a block diagram of a second exemplary embodiment of PV power generation system 100 that includes the plurality of PV collector units 102. In the second exemplary embodiment, the plurality of PV collector units 102 are coupled in a star configuration, also referred to as a wye configuration.

In both the first exemplary embodiment and the second exemplary embodiment, PV power generation system 100 also includes a grid-side inverter 104, a power transformer 106, and a system controller 108. PV power generation system 100 provides symmetric three-phase AC to electrical grid 18 (shown in FIG. 1). Although described herein as providing AC to electrical grid 18, system 100 may provide AC to any suitable load. In the exemplary embodiment, each of the plurality of PV collector units 102 includes a PV collection device and a collector-side inverter. For example, a first PV collector unit 120 includes a first collector-side inverter 122 coupled to a first PV collection device 124. A second PV collector unit 126 includes a second collector-side inverter 128 coupled to a second PV collection device 130. A third PV collector unit 132 includes a third collector-side inverter 134 coupled to a third PV collection device 136. A fourth PV collector unit 138 includes a fourth collector-side inverter 140 coupled to a fourth PV collection device 142. A fifth PV collector unit 144 includes a fifth collector-side inverter 146 coupled to a fifth PV collection device 148. A sixth PV collector unit 150 includes a sixth collector-side inverter 152 coupled to a sixth PV collection device 154. Although illustrated as including six PV collector units, system 100 may include any suitable number of collector units that allows system 100 to function as described herein. PV collection devices 124, 130, 136, 142, 148, and 154 may include a single PV cell, a plurality of PV cells assembled into a PV module, a plurality of PV modules assembled to form a PV module string, or any other configuration of PV cells that allows system 100 to function as described herein.

Because each of the plurality of PV collector units 102 includes a PV collection device and a collector-side inverter, each of the plurality of PV collector units 102 may operate at approximately a unity power factor. Operating close to a unity power factor facilitates delivering a maximum real power with minimum line losses to grid 18. Furthermore, each of the plurality of PV collector units 102 is also able to operate at a maximum power point for the inverter/collection device combination. More specifically, each collector-side inverter can be controlled separately to match the impedance of the corresponding PV collection device, and therefore, operate at the maximum power point. For example, first collector-side inverter 122 is controlled by system controller 108 to operate at the maximum power point for first PV collection device 124. Since each of the plurality of inverters can operate at a distinct maximum power point, a unique maximum power is extracted from PV collection devices 124, 130, 136, 142, 148, and 154.

In the first exemplary embodiment, shown in FIG. 2, a low-voltage single-phase AC 158 output by the plurality of PV collector units 102 is applied between two of three conductors of a three-phase system, first conductor 160, second conductor 162, or third conductor 164. Single-phase inverters 122, 128, 134, 140, 146, and 152 can be coupled to three-phase electrical grid 18 such that each inverter is connected between any two of the three conductors 160, 162, and 164. Conductors 160, 162, and 164 are coupled to power transformer 106 and grid-side inverter 104.

In the second exemplary embodiment, shown in FIG. 3, low-voltage single-phase AC 158 output by the plurality of PV collector units 102 is applied to at least one of three conductors of a three-phase system, first conductor 160, second conductor 162, or third conductor 164. The single-phase inverters 122, 128, 134, 140, 146, and 152 can be coupled to the three-phase grid such that one output of each of the inverters is connected to one of the three conductors and the remaining output of each of the inverters is connected to a neutral conductor 166. Conductors 160, 162, 164, and 166 are coupled to power transformer 106 through grid-side inverter 104.

Power transformer 106 may be a standard three-phase transformer that generates a high-voltage three-phase AC 174 for application to electrical grid 18 (shown in FIG. 1). In the exemplary embodiment, grid-side inverter 104 stabilizes and regulates voltage delivered to grid 18. During steady-state operation of system 100, a symmetric three-phase AC is provided by grid-side inverter 104. During transient events, for example, grid events such as power surges along the electrical grid or LVRT events, grid-side inverter 104 facilitates LVRT and zero voltage ride through (ZVRT), for example, by detecting and compensating for the voltage disturbance by injecting leading or lagging reactive power onto grid 18. Furthermore, grid-side inverter 104 may also provide power factor correction during steady state operation.

In the exemplary embodiment, system controller 108 provides control signals 176 to grid-side inverter 104 to perform the functions described herein. Furthermore, system controller 108 provides one or more of the plurality of collector units 102, and more specifically, at least one of collector-side inverters 122, 128, 134, 140, 146, and 152, with a power factor reference signal and/or a power curtailment signal upon detection of a grid event. The system controller 108 may provide additional information to those inverters connected to a common conductor 160, 162 or 164 including real and reactive power commands. System 100 minimizes coordination necessary between inverters 122, 128, 134, 140, 146, and 152, easing processing demands on system controller 108 and facilitating higher power production from each of the plurality of PV collector units 102. System 100 facilitates operating each of the plurality of collector units 102 at an individual maximum power point, eliminates DC wiring between collector units 102 and grid-side inverter 104, and provides rapid curtailment of collector units 102 during a grid event.

Furthermore, collector-side inverters 122, 128, 134, 140, 146, and 152 allow system 100 to provide symmetric three-phase AC power even during a temporary failure and/or permanent degradation of a subset of the plurality of PV collector units 102. For example, system 100 provides symmetric three-phase AC power even if one or more of collector-side inverters 122, 128, 134, 140, 146, and 152 has failed. If the loss of production of one or more of collector-side inverters 122, 128, 134, 140, 146, and 152 leads to an undesired asymmetry in generation system 100, grid-side inverter 104 is controlled such that real and reactive power is extracted from a conductor with excess power generation and provided to a conductor with a lack of power generation. In some embodiments, system 100 can also be controlled such that a controlled asymmetric generation system is presented to electrical grid 18 to compensate for grid asymmetries such as single-phase faults or asymmetric loads. In other words, system 100 facilitates separately controlling real and reactive power applied to each of conductors 160, 162, and 164.

In some embodiments, collector-side inverters 122, 128, 134, 140, 146, and 152 each include a memory unit 178. For example, memory unit 178 is positioned within, or coupled to, collector-side inverter 122. Memory unit 178 stores operating parameters used to control operation of collector-side inverter 122. More specifically, operating parameters that enable inverter 122 to ride through a grid event may be stored in memory unit 178. The grid event may be identified by system controller 108 and/or identified by inverter 122. For example, memory unit 178 may store a threshold grid voltage power command, a voltage ride through return command, and/or a reactive power command. In some embodiments, inverter 122 operates based on the threshold grid voltage power command when a grid voltage is less than a stored threshold grid voltage. The stored threshold grid voltage may indicate an occurrence of a low voltage ride through event or a zero voltage ride through event. The voltage ride through return command may include a predetermined time period, after which inverter 122 is instructed to begin providing power to electrical grid 18. The voltage ride through return command may also include a predefined ramp rate, with which inverter 122 is instructed to provide power to electrical grid 18. The reactive power command may control reactive power output of inverter 122 including when inverter 122 is to provide reactive power. Operating in response to operating parameters stored in memory unit 178 facilitates autonomous control of inverter 122 (i.e., controlling inverter 122 based on operating parameters not received from system controller 108). Moreover, memory unit 178 may include a computer-readable medium, such as, without limitation, random access memory (RAM), flash memory, a hard disk drive, a solid state drive, a diskette, a flash drive, a compact disc, a digital video disc, and/or any suitable memory that enables storage, retrieval, and/or execution of instructions and/or data. Moreover, system controller 108 may adjust the stored operating parameters prior to an occurrence of a grid event.

Moreover, in some embodiments, the plurality of PV collector units 102 are geographically dispersed. System controller 108 may control the collector unit 120 to provide a different level of reactive power than is provided by the collector unit 150. Each of the plurality of geographically dispersed PV collector units 102 may be separately controlled to facilitate balanced operation of PV power generation system 100 and to minimize system losses internal to system 100.

Figure 4:
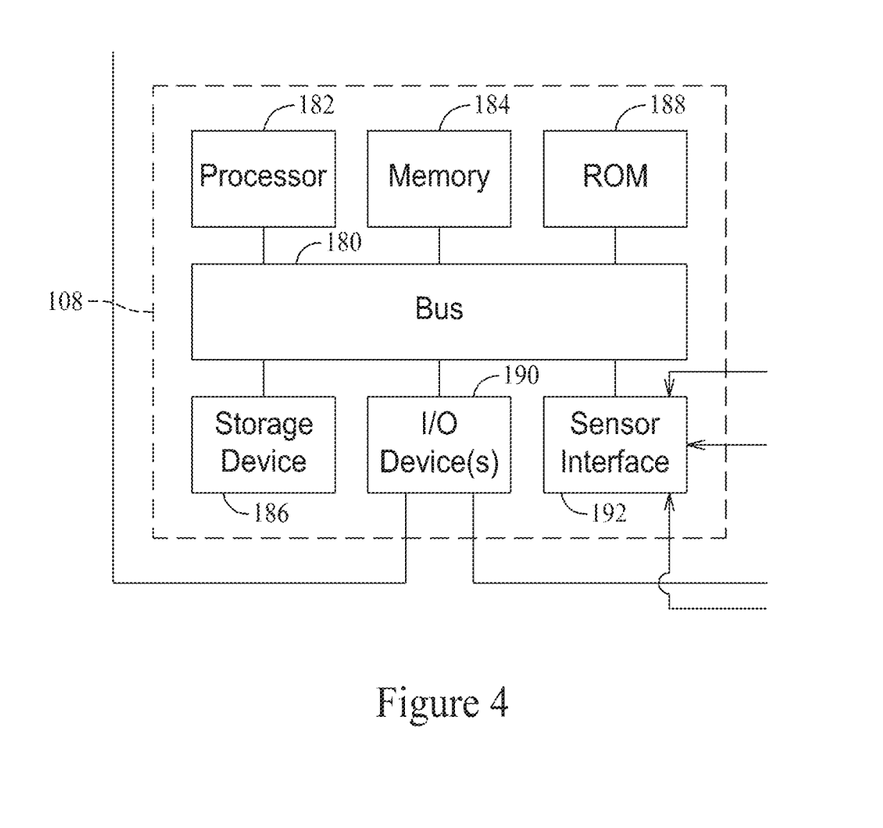
FIG. 4 is a block diagram of an exemplary embodiment of a system controller that may be included in the PV power generation system shown in FIG. 2.

FIG. 4 is a block diagram of an exemplary embodiment of system controller 108 (shown in FIG. 1). In some embodiments, system controller 108 includes a bus 180 or other communications device to communicate information. One or more processor(s) 182 are coupled to bus 180 to process information, including information from sensors included in PV collector units 102. Processor(s) 182 may include at least one computer. As used herein, the term computer is not limited to integrated circuits referred to in the art as a computer, but broadly refers to a processor, a microcontroller, a microcomputer, a programmable logic controller (PLC), an application specific integrated circuit, and other programmable circuits, and these terms are used interchangeably herein.

System controller 108 may also include one or more random access memories (RAM) 184 and/or other storage device(s) 186. RAM(s) 184 and storage device(s) 186 are coupled to bus 180 to store and transfer information and instructions to be executed by processor(s) 182. RAM(s) 184 (and/or storage device(s) 186, if included) can also be used to store temporary variables or other intermediate information during execution of instructions by processor(s) 182. System controller 108 may also include one or more read only memories (ROM) 188 and/or other static storage devices coupled to bus 180 to store and provide static (i.e., non-changing) information and instructions to processor(s) 182. Processor(s) 182 process information transmitted from a plurality of electrical and electronic devices that may include, without limitation, irradiance sensors and power meters. Instructions that are executed include, without limitation, resident conversion and/or comparator algorithms. The execution of sequences of instructions is not limited to any specific combination of hardware circuitry and software instructions.

System controller 108 may also include, or may be coupled to, input/output device(s) 190. Input/output device(s) 190 may include any device known in the art to provide input data to system controller 108 and/or to provide outputs, such as, but not limited to, solar panel positioning outputs and/or inverter control outputs. Instructions may be provided to RAM 184 from storage device 186 including, for example, a magnetic disk, a read-only memory (ROM) integrated circuit, CD-ROM, and/or DVD, via a remote connection that is either wired or wireless providing access to one or more electronically-accessible media. In some embodiments, hard-wired circuitry can be used in place of or in combination with software instructions. Thus, execution of sequences of instructions is not limited to any specific combination of hardware circuitry and software instructions, whether described and/or shown herein. Also, in the exemplary embodiment, input/output device(s) 190 may include, without limitation, computer peripherals associated with an operator interface (e.g., a human machine interface (HMI)) such as a mouse and a keyboard (neither shown in FIG. 4). Furthermore, in the exemplary embodiment, additional output channels may include, for example, an operator interface monitor and/or alarm device (neither shown in FIG. 4). System controller 108 may also include a sensor interface 192 that allows system controller 108 to communicate with sensors. Sensor interface 192 may include one or more analog-to-digital converters that convert analog signals into digital signals that can be used by processor(s) 182. System controller 108 may also be coupled to external supervisory control systems such as a supervisory control and data acquisition (SCADA) system, for example, a SCADA associated with a utility company, and/or a substation or network controller.

Figure 5:
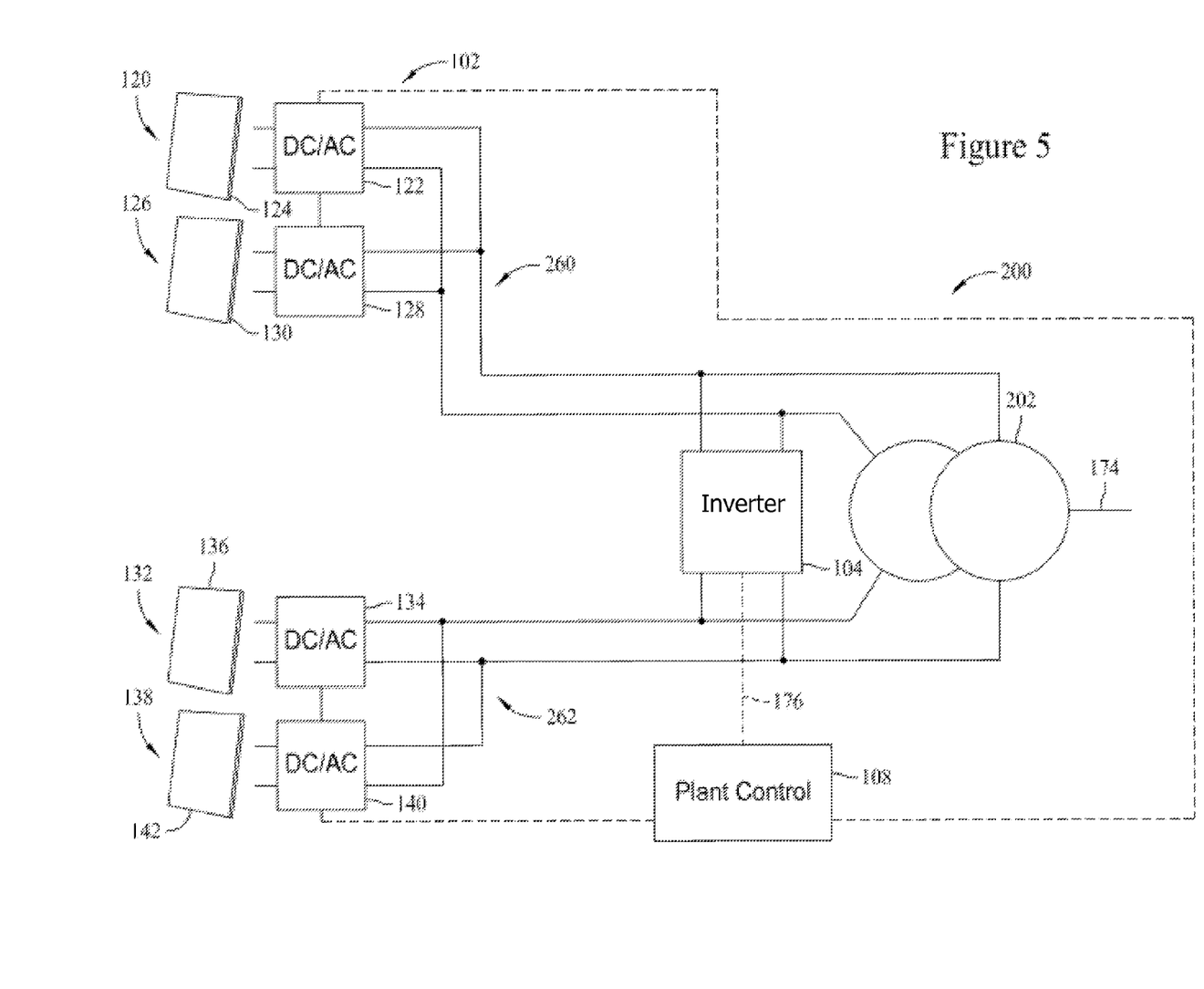
FIG. 5 is a block diagram of a first alternative embodiment of a PV power generation system that includes a plurality of collector-side inverters.

FIG. 5 is a block diagram of an alternative embodiment 200 of a PV power generation system that includes a plurality of PV collector units 102. Components common to system 100 (shown in FIGS. 2 and 3) and system 200 are identified with identical reference numerals. In this embodiment, PV power generation system 200 includes grid-side inverter 104 and system controller 108. PV power generation system 200 also includes a power transformer 202. In this embodiment, plurality of PV collector units 102 includes first PV collector unit 120, second PV collector unit 126, third PV collector unit 132, and fourth PV collector unit 138. Each of the plurality of PV collector units 102 includes a PV collection device and a single-phase collector-side inverter. As described above, first PV collector unit 120 includes first collector-side inverter 122 coupled to first PV collection device 124. Second PV collector unit 126 includes second collector-side inverter 128 coupled to second PV collection device 130. Third PV collector unit 132 includes third collector-side inverter 134 coupled to third PV collection device 136. Fourth PV collector unit 138 includes fourth collector-side inverter 140 coupled to fourth PV collection device 142.

In this embodiment, PV collector units 102 can each be configured to operate at any power factor including unity power factor. Furthermore, each of the plurality of PV collector units 102 is also able to operate at a maximum power point for the inverter/collection device combination. For example, first collector-side inverter 122 is configured to operate at the maximum power point for first PV collection device 124. Because each of the plurality of inverters can operate at a distinct maximum power point, a maximum power is extracted from PV collection devices 124, 130, 136, and 142.

In the embodiment, as shown in FIG. 5, power transformer 202 outputs a three-phase AC from two-phase AC. First collector unit 120 and second collector unit 126 are coupled and provide a low-voltage AC 260 having a first phase. Third collector unit 132 and fourth collector unit 138 are coupled and provide a low-voltage AC 262 having a second phase. Power transformer 202 divides low-voltage AC 260 having a first phase (i.e., the current provided by first PV collector unit 120 and second PV collector unit 126), and low-voltage AC 262 having a second phase (i.e., the current provided by third PV collector unit 132 and fourth PV collector unit 138) into balanced high-voltage three-phase AC 174 for transmission over electrical grid 18 (shown in FIG. 1). Power transformer 202 may include, but is not limited to, a Scott-T transformer.

In this embodiment, and as described above with respect to system 100, grid-side inverter 104 stabilizes and regulates voltage delivered to electrical grid 18. During steady-state operation of system 200, a symmetric three-phase AC is provided by grid-side inverter 104. During transient events, for example, grid events such as power surges along the electrical grid or LVRT events, grid-side inverter 104 facilitates LVRT, for example, by detecting and compensating for the voltage disturbances by injecting leading or lagging reactive power into electrical grid 18. Therefore, grid-side inverter 104 may provide power factor correction. In the exemplary embodiment, system controller 108 provides control signals 176 to grid-side inverter 104 to perform the functions described herein. Furthermore, system controller 108 provides one or more of the plurality of collector units 102, and more specifically, at least one of inverters 122, 128, 134, and 140, with a curtailment signal upon detection of a grid event. System 200 minimizes coordination necessary between inverters 122, 128, 134, and 140, easing processing demands on system controller 108 and facilitating higher power production from PV collection devices 124, 130, 136, and 142. System 200 facilitates operating the plurality of collector units 102 at an individual maximum power point, eliminating DC wiring between collector units 102 and grid-side inverter 104, and providing rapid curtailment of PV collector units 102 during a grid event. Furthermore, system 200 reduces wiring complexity when compared to system 100. Moreover, system 200 reduces an amount of power electronics needed in grid-side inverter 104.

Figure 6:
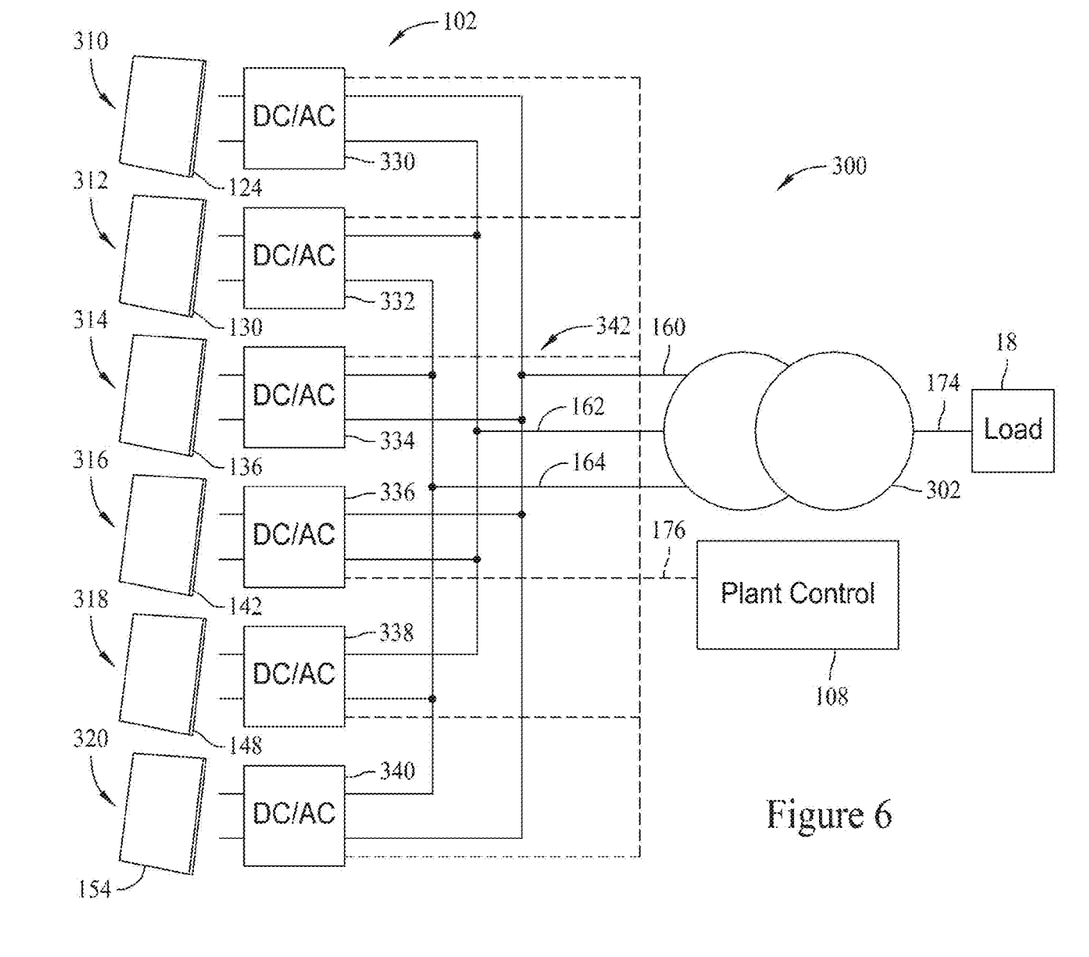
FIG. 6 is a block diagram of a second alternative embodiment of a PV power generation system that includes a plurality of collector-side inverters.

FIG. 6 is a block diagram of another alternative embodiment 300 of a PV power generation system that includes a plurality of collector units 102. Components shared between system 100 (shown in FIGS. 2 and 3), system 200 (shown in FIG. 4), and system 300 are identified with identical reference numerals.

In this embodiment, as shown in FIG. 6, PV power generation system 300 includes system controller 108 and a power transformer 302. Plurality of PV collector units 102 includes a first PV collector unit 310, a second PV collector unit 312, a third PV collector unit 314, a fourth PV collector unit 316, a fifth PV collector unit 318, and a sixth PV collector unit 320. Each of the plurality of PV collector units 102 includes a PV collection device and a single-phase collector-side inverter. First PV collector unit 310 includes a first collector-side inverter 330 coupled to first PV collection device 124. Second PV collector unit 312 includes a second collector-side inverter 332 coupled to second PV collection device 130. Third PV collector unit 314 includes a third collector-side inverter 334 coupled to third PV collection device 136. Fourth PV collector unit 316 includes a fourth collector-side inverter 336 coupled to fourth PV collection device 142. Fifth PV collector unit 318 includes a fifth collector-side inverter 338 coupled to fifth PV collection device 148. Sixth PV collector unit 320 includes a sixth collector-side inverter 340 coupled to sixth PV collection device 154.

In this embodiment, each of the plurality of PV collector units 102 is configured to operate at a wide power factor range, including at unity power factor. The plurality of PV collector units 102 may be configured to operate at, for example, but not limited to, a range of power factors from approximately −0.9 to unity to 0.9. Furthermore, each of the plurality of PV collector units 102 is also able to operate at a maximum power point for the inverter/collection device combination. For example, first collector-side inverter 330 is configured to operate at the maximum power point for first PV collection device 124. Because each of the plurality of inverters 330, 332, 334, 336, 338, and 340 can operate at a distinct maximum power point, a maximum power is extracted from PV collection devices 124, 130, 136, 142, 148, and 154.

Notably, PV power generation system 300 does not include grid-side inverter 104. In this embodiment, collector-side inverters 330, 332, 334, 336, 338, and 340 are rated to stabilize and regulate voltage delivered to electrical grid 18 (shown in FIG. 1). System controller 108 provides control signals to each of collector-side inverters 330, 332, 334, 336, 338, and 340 to provide electrical grid 18 with symmetric three-phase AC 174 during steady-state operation of system 300. Furthermore, during transient events, collector-side inverters 330, 332, 334, 336, 338, and 340 facilitate LVRT, for example, by detecting and compensating for the voltage disturbances by injecting leading or lagging reactive power into electrical grid 18, and therefore, providing a power factor correction. Furthermore, collector-side inverters 330, 332, 334, 336, 338, and 340 may be curtailed in response to a curtailment signal from system controller 108. System 300 may also be controlled to generate an asymmetric unbalanced generation system with respect to real and reactive power injection in response to grid conditions. For example, system controller 108 may provide collector-side inverters 330, 332, 334, 336, 338, and 340 with a power factor reference signal upon detection of a grid condition, for example, a load failure. Furthermore, collector-side inverters 330, 332, 334, 336, 338, and 340 may autonomously respond to grid conditions including high voltage and low voltage ride through conditions, providing Var support, frequency drop response, and automatic voltage regulation. System controller 108 provides control signals at a low data rate to optimize a response of system 300 and to minimize system losses during steady state operation. System controller 108 may also serve as a data acquisition system.

In the embodiment shown in FIG. 6, the plurality of PV collector units 102 output a low-voltage single-phase AC 342, which is applied to one of three conductors, first conductor 160, second conductor 162, or third conductor 164. As an example, first inverter 330 and fourth inverter 336 are coupled between first conductor 160 and second conductor 162. Second inverter 332 and fifth inverter 338 are coupled between second conductor 162 and third conductor 164. Third inverter 334 and sixth inverter 340 are coupled between third conductor 164 and first conductor 160. Although illustrated in a delta configuration, first inverter 330, second inverter 332, third inverter 334, fourth inverter 336, fifth inverter 338, and sixth inverter 340 may also be coupled in a star configuration.

Conductors 160, 162, and 164 are coupled to power transformer 106. Power transformer 106 outputs high-voltage three-phase AC 174 for application to electrical grid 18.

Figure 7:
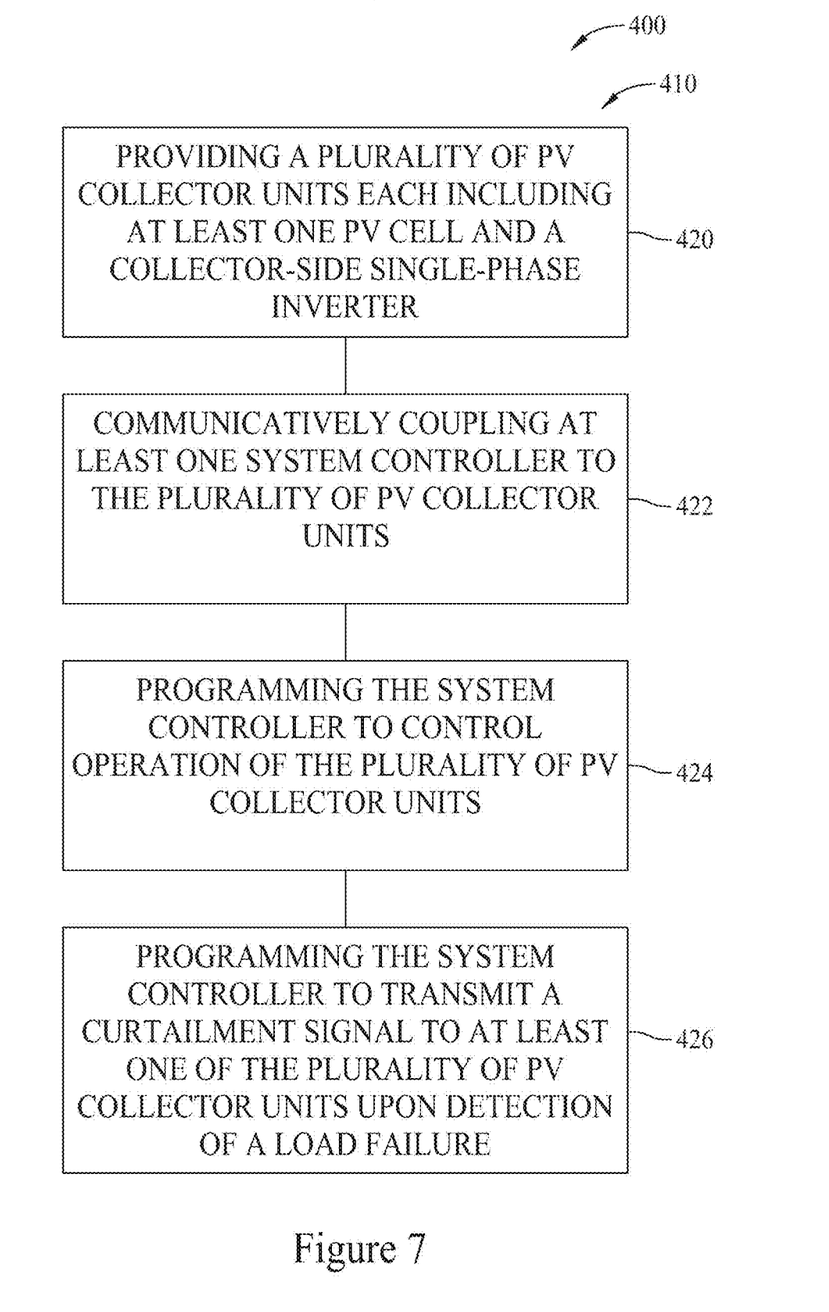
FIG. 7 is a flow chart of an exemplary method for controlling operation of the PV power generation systems shown in FIGS. 2-6.

FIG. 7 is a flow chart 400 of an exemplary method 410 for controlling operation of PV power generation systems 100, 200, and 300 (shown in FIGS. 2-5). More specifically, method 410 converts direct current (DC) power to alternating current (AC) power for delivery to an electrical load, for example, electrical grid 18 (shown in FIG. 1), wherein the DC power is produced by a plurality of variable input single-phase power sources, for example, PV collection devices 124, 130, 136, 142, 148, and 154. In the exemplary embodiment, method 410 includes providing 420 a plurality of photovoltaic PV collector units, each including at least one PV cell and a collector-side single-phase inverter, the plurality of PV collector units configured to generate a DC voltage and convert the DC voltage to a single-phase AC output. For example, PV collector units 102 (shown in FIG. 2) are provided 420 and include PV collection devices 124, 130, 136, 142, 148, and 154, which generate a DC voltage, and collector-side single-phase inverters 122, 128, 134, 140, 146, and 152, which convert the DC voltage to single-phase AC 158 (shown in FIG. 2).

In the exemplary embodiment, method 410 also includes communicatively coupling 422 at least one system controller, for example, system controller 108 (shown in FIG. 2), to the plurality of PV collector units 102. Method 410 also includes programming 424 system controller 108 to control operation of the plurality of PV collector units 102. Method 410 may also include programming 426 system controller 108 to transmit a curtailment signal to at least one of the plurality of PV collector units 102 upon detection of a load failure.

The above-described embodiments facilitate efficient and cost-effective operation of a solar power generation system. The methods and systems described herein facilitate conditioning power generated by a plurality of solar collector units for delivery to an electrical distribution grid. The power delivered to the electrical grid fulfills grid connectivity expectations including, but not limited to, steady-state and transient symmetry, reactive power control, provision of fault current, ramp rate shaping, and grid event ride through. Capital expenditures, power conversion losses, and line losses are minimized. The methods and systems described herein facilitate supporting grid symmetry during temporary failures or permanent degradation of a subset of power generation assets. Furthermore, the embodiments described herein support and control symmetric and asymmetric fault currents.

Exemplary embodiments of a solar power generation system are described above in detail. The methods and systems are not limited to the specific embodiments described herein, but rather, components of the systems and/or steps of the methods may be utilized independently and separately from other components and/or steps described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A photovoltaic (PV) power generation system, comprising:
   a plurality of PV collector units, each of the plurality of PV collector units comprising at least one PV cell and a collector-side single-phase inverter, the plurality of PV collector units each configured for coupling with an electrical grid via at least one transmission line;
   a grid-side inverter coupled between the at least one collector-side single-phase inverter of each PV collector unit and the electrical grid, the grid-side inverter configured to receive a single-phase alternating current (AC) output by each collector-side single-phase inverter and to provide a poly-phase AC to the electrical grid; and,
   a system controller communicatively coupled to each PV collector unit and to the grid-side inverter, the system controller configured to:
      separately coordinate operation of each of the plurality of PV collector units and the grid-side inverter;
      separately control real and reactive power applied to each phase of the poly-phase AC applied to the electrical grid; and,
      control operation of the plurality of PV collector units through at least one of a low voltage ride through (LVRT) event and a zero voltage ride through (ZVRT) event.

2. A system in accordance with claim 1, wherein each collector-side single-phase inverter comprises a memory unit that stores operating parameters, each collector-side single-phase inverter configured to operate in accordance with the operating parameters in response to at least one of measured grid conditions and a signal from the system controller.

3. A system in accordance with claim 2, wherein the operating parameters comprise at least one of a threshold grid voltage power command, a voltage ride through return command, and a reactive power command.

4. A system in accordance with claim 1, wherein the system controller is configured to transmit at least one of a power factor reference signal to at least one of the plurality of PV collector units, and a curtailment signal to at least one of the plurality of PV collector units upon detection of an electrical grid failure.

5. A system in accordance with claim 1, wherein each of the plurality of PV collector units is configured to operate at a maximum power point determined for the individual PV collector unit and to convert a direct current (DC) voltage to a single-phase alternating current (AC) output.

6. A system in accordance with claim 5, further comprising a transformer configured to receive the single-phase AC output and convert the single-phase AC output from a plurality of collector-side single-phase inverters to a balanced poly-phase AC output.

7. A system in accordance with claim 1, wherein the plurality of PV collector units comprises a first plurality of PV collector units producing AC having a first phase and a second plurality of PV collector units producing AC having a second phase, the AC having the first phase and the AC having the second phase are provided to a transformer, the transformer configured to convert the two-phase AC to a balanced three-phase AC.

8. A method for converting direct current (DC) power to alternating current (AC) power for delivery to an electrical grid via at least one transmission line, wherein the DC power is produced by a plurality of variable input power sources, said method comprising:
providing a plurality of photovoltaic (PV) collector units, each of the plurality of PV collector units including at least one PV cell and a collector-side single-phase inverter, the plurality of PV collector units configured to generate a DC voltage and convert the DC voltage to a single-phase AC output;
coupling a grid-side inverter between the at least one collector-side single-phase inverter of each PV collector unit and the electrical grid, the grid-side inverter configured to receive a single-phase AC output by each collector-side single-phase inverter and to provide a poly-phase AC to the electrical grid;
communicatively coupling at least one system controller to each PV collector unit and to the grid-side inverter;
separately coordinating operation of each of the plurality of PV collector units and the grid-side inverter;
separately controlling real and reactive power applied to each phase of the poly-phase AC applied to the electrical grid; and,
programming the system controller to control operation of the plurality of PV collector units through at least one of a low voltage ride through (LVRT) event and a zero voltage ride through (ZVRT) event.

9. A method in accordance with claim 8, further comprising programming the at least one system controller to control at least one of:
transmit at least one of a power factor reference signal and a curtailment signal to at least one of the plurality of PV collector units upon detection of an electrical grid failure; and,
coordinate operation of the plurality of PV collector units to minimize system losses internal to a photovoltaic (PV) power generation system.

10. A method in accordance with claim 8, further comprising storing operating parameters within each collector-side single-phase inverter that control operation of each collector-side single-phase inverter upon detection of a grid event.

11. A method in accordance with claim 8, further comprising configuring the plurality of PV collector units to produce reactive power and apply the reactive power to the electrical grid.

12. A power conversion system, comprising:
a plurality of collector-side single-phase inverters each configured for coupling with an electrical grid via at least one transmission line, the plurality of collector-side single-phase inverters configured to receive variable input direct current (DC) voltage and configured to store operating parameters and operate in accordance with the operating parameters in response to grid conditions;
a grid-side inverter coupled between the plurality of collector-side single-phase inverters and the electrical grid, the grid-side inverter configured to receive a single-phase alternating current (AC) output by each collector-side single-phase inverter and to provide a poly-phase AC to the electrical grid; and,
a system controller communicatively coupled to the plurality of collector-side single-phase inverters and to the grid-side inverter, the system controller configured to:
separately coordinate operation of each of the plurality of PV collector units and the grid-side inverter;
separately control real and reactive power applied to each phase of the poly-phase AC applied to the electrical grid; and,
control operation of the plurality of collector-side single-phase inverters through at least one of a low voltage ride through (LVRT) event and a zero voltage ride through (ZVRT) event, the plurality of collector-side single-phase inverters configured to provide a poly-phase alternating current (AC) to the electrical grid.

13. A power conversion system in accordance with claim 12, wherein the system controller is configured to adjust the stored operating parameters prior to an occurrence of a grid condition.

14. A power conversion system in accordance with claim 12, wherein each of the plurality of collector-side single-phase inverters are configured to separately control real and reactive power applied to each phase of the poly-phase AC.

* * * * *